(12) United States Patent
Faucett, Jr. et al.

(10) Patent No.: US 10,343,722 B2
(45) Date of Patent: Jul. 9, 2019

(54) VEHICLE WHEEL HOUSING SYSTEM WITH HEATED WHEEL WELL LINER AND METHOD OF HEATING A WHEEL WELL LINER

(71) Applicant: GM GLOBAL TECHNOLOGY OPERATIONS LLC, Detroit, MI (US)

(72) Inventors: Michael A. Faucett, Jr., Madison Heights, MI (US); David T. Renke, Macomb, MI (US)

(73) Assignee: GM Global Technology Operations LLC., Detroit, MI (US)

(*) Notice: Subject to any disclaimer, the term of this patent is extended or adjusted under 35 U.S.C. 154(b) by 281 days.

(21) Appl. No.: 15/240,411

(22) Filed: Aug. 18, 2016

(65) Prior Publication Data

US 2018/0050732 A1 Feb. 22, 2018

(51) Int. Cl.
| | |
|---|---|
| *B62D 25/16* | (2006.01) |
| *B62D 25/18* | (2006.01) |
| *H05B 1/02* | (2006.01) |
| *B60K 37/06* | (2006.01) |
| *B60R 13/08* | (2006.01) |
| *B60R 16/03* | (2006.01) |

(52) U.S. Cl.
CPC .............. *B62D 25/18* (2013.01); *B60K 37/06* (2013.01); *B60R 13/0861* (2013.01); *B60R 16/03* (2013.01); *B62D 25/16* (2013.01); *B62D 25/161* (2013.01); *H05B 1/0236* (2013.01); *B60Y 2400/302* (2013.01); *B60Y 2400/305* (2013.01)

(58) Field of Classification Search
CPC ... B60S 1/66; B60S 1/68; B62D 25/16; B62D 25/18; H05B 1/0236
See application file for complete search history.

(56) References Cited

U.S. PATENT DOCUMENTS

| | | | | |
|---|---|---|---|---|
| 4,745,804 A | * | 5/1988 | Goldberg | G08B 19/02 340/580 |
| 5,897,802 A | * | 4/1999 | Jones | B62D 25/18 219/202 |
| 2004/0021575 A1 | * | 2/2004 | Oskorep | B60S 1/026 340/601 |

(Continued)

FOREIGN PATENT DOCUMENTS

| | | |
|---|---|---|
| CA | 2276992 A1 | 1/2000 |
| CN | 1647584 A | 7/2005 |

(Continued)

*Primary Examiner* — Eric S Ruppert
(74) *Attorney, Agent, or Firm* — Quinn IP Law

(57) ABSTRACT

A system for a vehicle with a wheel housing includes a wheel well liner secured to the wheel housing and disposed in a wheel well defined by the wheel housing. The system further includes a heating element in contact with the wheel well liner and operable to heat the wheel well liner. A method of heating a wheel well liner includes determining whether an ambient temperature around the wheel well liner is less than a predetermined temperature, determining whether a weight of a load on the wheel well liner is greater than a predetermined weight, and activating a heating element in contact with the wheel well liner if the ambient temperature is less than the predetermined temperature and the weight on the wheel well liner is greater than the predetermined weight.

17 Claims, 3 Drawing Sheets

(56) References Cited

U.S. PATENT DOCUMENTS

2008/0296279 A1* 12/2008 Forrest .................. B62D 25/16
                                                                               219/202
2016/0229460 A1* 8/2016 Kowalk ................. B62D 25/16

FOREIGN PATENT DOCUMENTS

| CN | 201646876 U | 11/2010 |
| CN | 202152074 U | 2/2012 |
| CN | 203460958 U | 3/2014 |
| CN | 205034183 U | 2/2016 |
| DE | 102010000957 A1 | 7/2011 |
| JP | 3876427 B2 | 1/2007 |

* cited by examiner

VEHICLE WHEEL HOUSING SYSTEM WITH HEATED WHEEL WELL LINER AND METHOD OF HEATING A WHEEL WELL LINER

TECHNICAL FIELD

The present teachings generally include a vehicle wheel housing system with a heated wheel well liner, and a method of heating a wheel well liner.

BACKGROUND

Many vehicles are constructed with a wheel housing creating a wheel well that surrounds a tire and wheel assembly with space between the rotating tire and wheel and the wheel housing. In some climates, snow and ice can build up on the wheel housing in the wheel well.

SUMMARY

A wheel housing system for a vehicle has a heated wheel well liner that can eliminate snow and ice buildup in the wheel well. A method of heating a wheel well liner is also provided. A system for a vehicle with a wheel housing includes a wheel well liner secured to the wheel housing and disposed in a wheel well defined by the wheel housing. The system further includes a heating element in contact with the wheel well liner and operable to heat the wheel well liner. The heated wheel well liner may be activated by a controller in some embodiments, or manually in other embodiments.

In some embodiments, the wheel housing system includes a weight sensor operatively connected to the wheel well liner and operable to indicate a weight of a load on the wheel well liner. A controller is operatively connected to the weight sensor and the heating element. An energy source is operatively connected to the controller and to the heating element. The controller commands the energy source to energize the heating element based at least partially on the weight indicated by the weight sensor.

In some embodiments, the system includes a temperature sensor operatively connected to the controller. The controller commands the energy source to energize the heating element based at least partially on an ambient temperature indicated by the temperature sensor.

In one embodiment, the heated wheel well liner is activated in conjunction with activation of an engine block heater. More specifically, the vehicle includes an engine block, and the system further includes an energy source operatively connected to the heating element and to the engine block. An electrical connector selectively connects the energy source with the engine block and the heating element such that the energy source heats the engine block. The energy source heats the wheel well liner via the heating element.

In a manually-actuated embodiment, the system includes a controller and an energy source operatively connected to the controller. A manual actuation mechanism is operatively connected to the controller and is manually actuatable to provide an actuation signal to the controller. The controller commands the energy source to energize the heating element based at least partially on the actuation signal. For example, the manual actuation mechanism may be a push button on the vehicle dashboard, or on a key FOB, or on both.

A method of heating a wheel well liner executed by a controller includes determining whether an ambient temperature around the wheel well liner is less than a predetermined temperature, and determining whether a weight of a load on the wheel well liner is greater than a predetermined weight. The method further includes activating a heating element in contact with the wheel well liner if the ambient temperature is less than the predetermined temperature and the weight on the wheel well liner is greater than the predetermined weight.

The above features and advantages and other features and advantages of the present teachings are readily apparent from the following detailed description of the best modes for carrying out the present teachings when taken in connection with the accompanying drawings.

DETAILED DESCRIPTION

Figure 1:
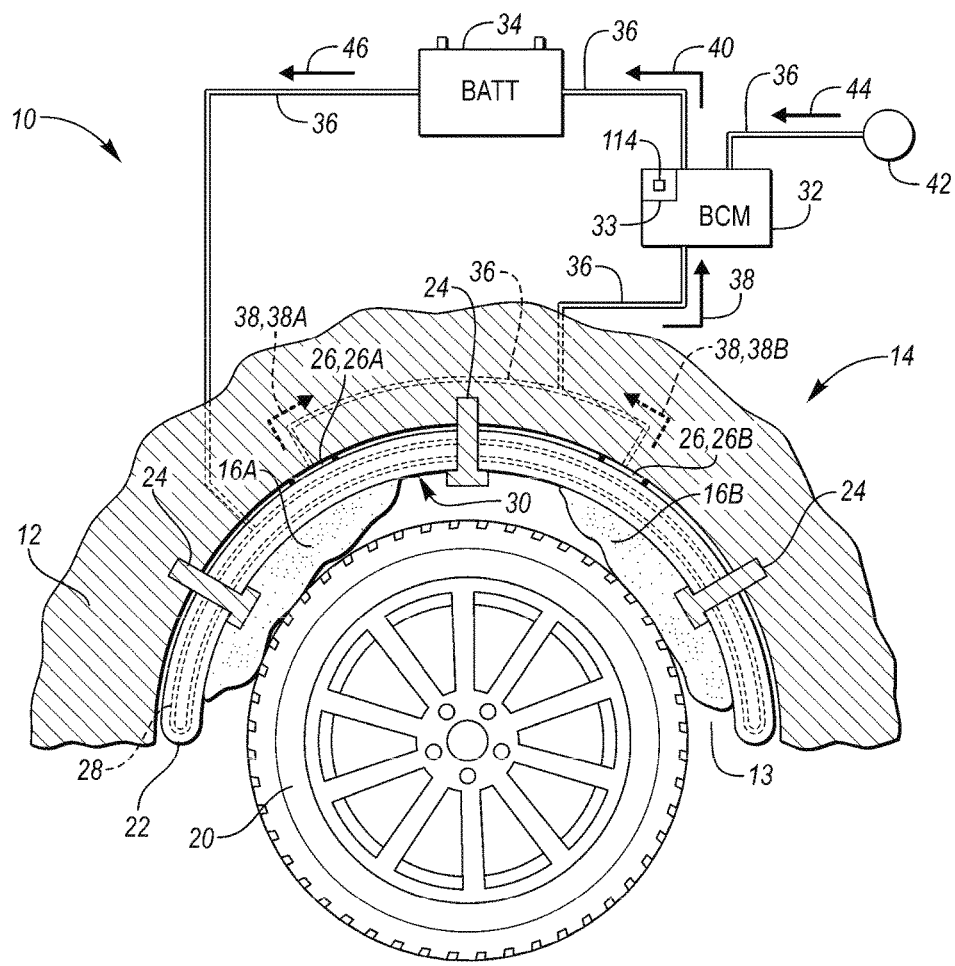
FIG. 1 is a schematic illustration in fragmentary partial cross-sectional view of a vehicle including a first embodiment of a wheel housing system.

Referring to the drawings, wherein like reference numbers refer to like components, FIG. 1 shows a portion of a vehicle 10 that includes a wheel housing 12. The wheel housing 12 may include one or more vehicle body panels and/or other body components that together define a wheel well 13. The vehicle 10 includes a system 14 for eliminating ice and snow from the wheel housing 12. More particularly, ice and snow can build up as one or more loads 16A, 16B in the wheel well 13. The loads 16A, 16B may be positioned against the wheel housing 12 as ice and snow is thrown radially outward against the wheel housing 12 as when a tire and wheel assembly 20 disposed in the wheel well 13 rotates.

To eliminate the loads 16A, 16B lodged in the wheel well 13, the system 14 includes a wheel well liner 22 that can be heated to melt the loads 16A, 16B sufficiently to dislodge them from the wheel well 13 exposed to loads 16A, 16B. The wheel well liner 22 is secured to the wheel housing 12 and is disposed in the wheel well 13. For example, the wheel well liner 22 is secured to the wheel housing 12 with fasteners 24 such as bolts.

The system 14 includes a weight sensor 26 that is operatively connected to the wheel well liner 22. The weight sensor 26 is operable to indicate a weight of a load 16A or 16B on the wheel well liner 22. One or more weight sensors 26 (individually labeled as 26A, 26B) may be connected to the wheel well liner 22. In the embodiment of FIG. 1, there are two weight sensors 26 disposed between the wheel well liner 22 and the wheel housing 12 and positioned on the wheel well liner 22 in locations where ice and snow buildup is most anticipated based on the shape of the wheel well 13 and the position of the tire and wheel assembly 20 in the wheel well 13. For example, one of the weight sensors 26A is positioned generally forward in the wheel well 13 and the other weight sensor 26B is positioned generally rearward in the wheel well 13.

The weight sensor 26 may be any of various suitable configurations for indicating the weight of a load 16A or 16B. For example, the weight sensor 26 may be embedded in or simply in contact with and secured to the wheel well liner 22. In the system 14 of FIG. 1, the weight sensors 26A, 26B are load cells positioned between and connected to both the wheel housing 12 and the wheel well liner 22. For example, the load cell may be a strain gauge transducer. The load cell can indicate a weight of the load 16A by an electrical signal proportional to a change in resistance experienced by the load cell with a change in weight acting on the load cell. Thus, the weight sensor 26A indicates the weight of the load 16A as the total weight of the wheel well liner 22 and the load 16A acting on the weight sensor 26A increases as the snow and ice buildup in the vicinity of the weight sensor 26A. Similarly, the weight sensor 26B indicates the weight of the load 16B as the total weight of the wheel well liner 22 and the load 16B acting on the weight sensor 26B increases as the snow and ice buildup in the vicinity of the weight sensor 26B.

Figure 2:
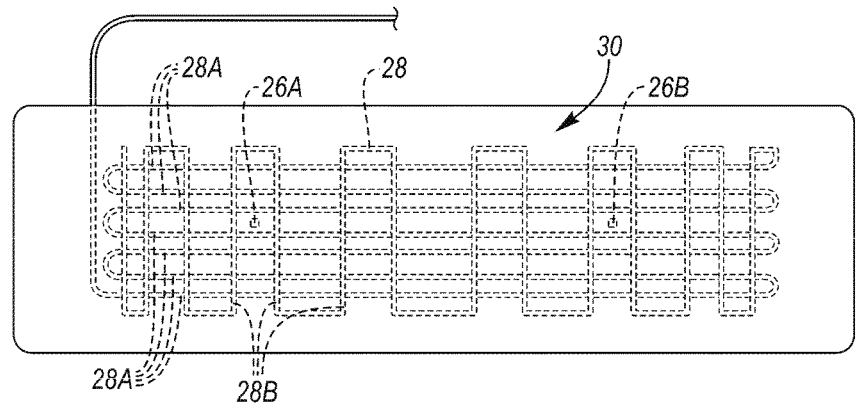
FIG. 2 is a schematic illustration in plan view of a wheel well liner and heating element included in the wheel housing system of FIG. 1.

The system 14 includes a heating element 28 in contact with and, in the embodiment shown, embedded in the wheel well liner 22. The heating element 28 is operable to heat the wheel well liner 22. As shown in FIGS. 1 and 2, the heating element 28 is one or more resistive electrical conductors (e.g., metallic wires) embedded in the wheel well liner 22. As best shown in FIG. 2, the heating element 28 is arranged in a crisscrossing grid pattern to provide heat to a large portion of the exposed outer surface 30 of the wheel well liner 22 to which the loads 16A 16B are frozen or wedged. More specifically, the heating element 28 is arranged in rows 28A and columns 28B (only some of which are labeled). Alternatively, the heating element 28 may be positioned only in more discrete zones correlated with areas on the outer surface 30 on which snow and ice buildup is anticipated. The weight sensors 26A, 26B are shown in hidden lines in FIG. 2, positioned on the wheel well liner 22.

The wheel well liner 22 must be a material sufficiently durable to withstand environmental exposure in the wheel well 13 and the temperature of the heating element 28. For example, the wheel well liner may be a fabric mesh, such as a felt material that may be polypropylene, or a plastic compound, such as a thermoplastic polymer.

Referring to FIG. 1, the system 14 further includes a controller 32 operatively connected to the weight sensors 26A, 26B, and to the heating element 28. The controller 32 may be a controller that is used for other functions as well on the vehicle, such as a vehicle body control module (BCM) that controls other vehicle body systems including heating ventilation and air conditioning (HVAC) systems, door latches, etc. The system 14 includes an energy source 34 operatively connected to the controller 32 and to the heating element 28. For example, the energy source 34 may be a battery (BATT) of a standard voltage level used for vehicle body components, such as 12 Volts. The controller 32, the energy source 34, and the load cells 26A, 26B are interconnected with transfer conductors 36 sufficient to transfer electrical signals, including sensor signals 38 (individually labeled 38A, 38B) from the load cells 16A, 16B to the controller 32, and control signals 40 from the controller 32 to the energy source 34.

Additionally, a temperature sensor 42 is operatively connected to the controller 32. The temperature sensor 42 may be positioned anywhere on the vehicle 10 where it is operable to sense an ambient temperature to which the surface 30 of the wheel well liner 22 is exposed (i.e., a temperature outside of the vehicle 10). The temperature sensor 42 is operatively connected to the controller 32 by a transfer conductor 36 and provides a sensor signal 44 indicative of the sensed temperature.

The controller 32 has a processor 33 that includes a set of stored instructions by which the controller 32 executes a control method to command the energy source 34 to energize the heating element 28 based at least partially on the weights indicated by the load sensors 26A, 26B and the ambient temperature (as indicated by the temperature signal 44 from the temperature sensor 42). The controller 32 commands the energy source 34 via the control signal 40 by which the energy source 34 is instructed to provide an electrical current 46 through a transfer conductor 36 connecting the energy source 34 to the heating element 28.

Figure 5:
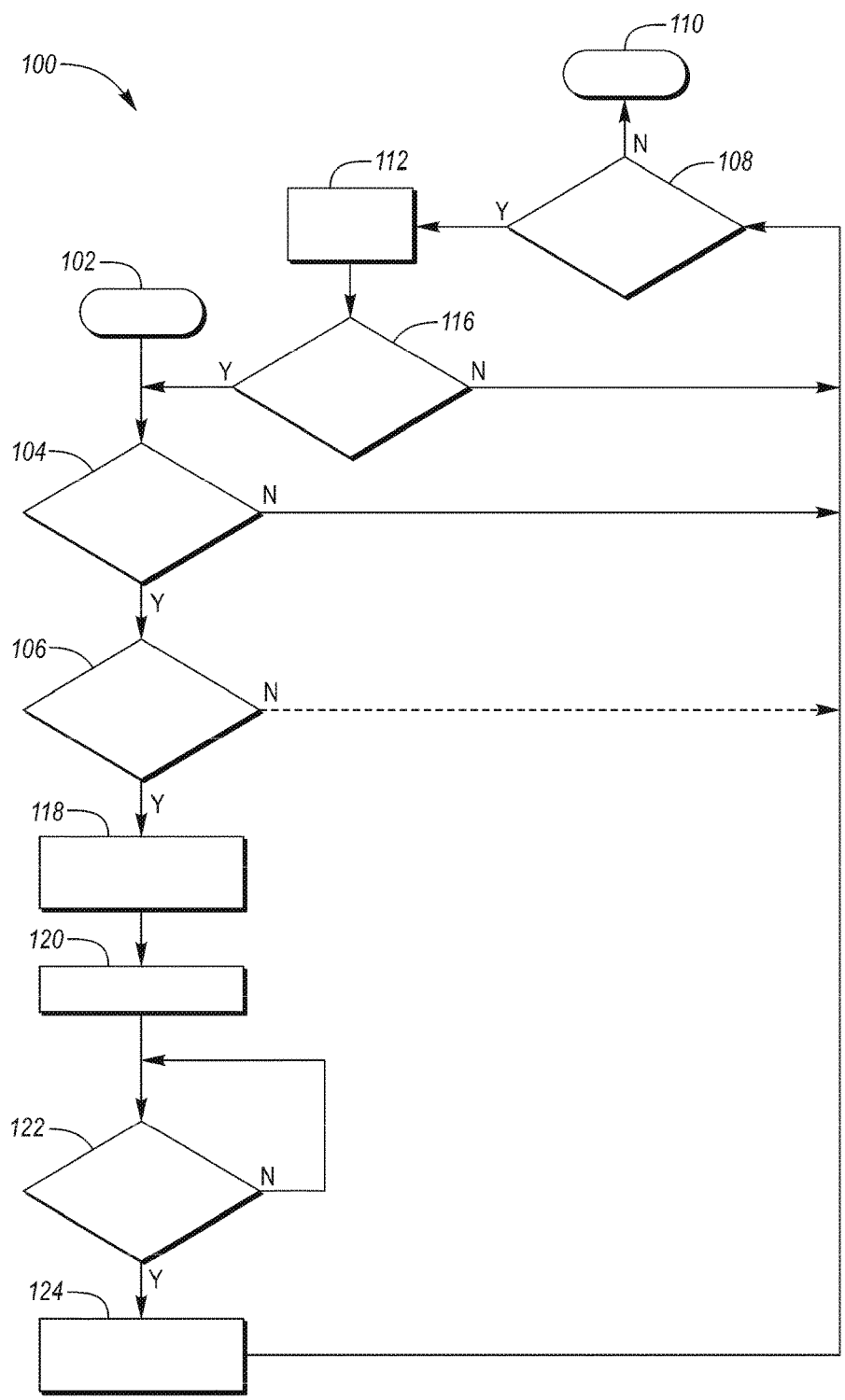
FIG. 5 is a schematic flow diagram illustrating a method of heating a wheel well liner.

More specifically, the controller 32 executes a control method 100 illustrated as a flow diagram in FIG. 5. The method 100 begins at start 102, such as when the vehicle 10 ignition is in the key-on or key-start position. The method 100 proceeds to block 104 in which the controller 32 determines based on the temperature signal 44 provided from the temperature sensor 42, whether an ambient temperature around the wheel well liner 22 is less than a predetermined temperature T1. The predetermined temperature T1 is a temperature at which snow and ice can form, so that activating the heating element 28 would be beneficial if snow and ice are present in the wheel well 13. For example, the predetermined temperature may be 32 degrees Fahrenheit.

If the controller 32 determines that the ambient temperature is less than the predetermined temperature T1 (as indicated by "Y"), then the method 100 proceeds to block 106. However, if the controller 32 determines that the ambient temperature is not less than the predetermined temperature T1 (as indicated by "N"), then the method 100 proceeds to block 108. In FIG. 5, "Y" indicates an affirmative answer to a query in the proceeding block, and "N" indicates a negative answer to the query.

In block 108, the method 100 first determines that the vehicle 10 is still keyed on or running. If the vehicle is no longer keyed on or running, the method 100 proceeds to end at block 110. If the vehicle 10 is still running as determined in block 108, then the method 100 proceeds to block 112 in which a timer 114 is started. The timer 114 is indicated in the controller 32 in FIG. 1, and is included in the processor 33 therein.

After the timer 114 is started in block 112, the method 100 proceeds to block 116 to determine the time that has elapsed since the timer 114 was started is greater than a predetermined period of time TM1. Stated differently, the controller 32 determines whether the timer 114 has exceeded a predetermined period of time TM1. If the timer 114 has not exceeded the predetermined period of time TM1, then the method 100 returns to block 108. If the timer 114 has exceeded the predetermined period of time TM1, then the method 100 returns to block 104. In one non-limiting example, the predetermined period of time TM1 may be 30 minutes.

If the method 100 proceeds from block 104 to block 106 as discussed above, then the controller 32 determines based on the load signal 38A or 38B provided from the load sensor 26A, 26B, respectively, whether a weight of a load 26A or 26B on the wheel well liner 22 is greater than a predetermined weight W1. For example, the predetermined weight W1 may be but is not limited to five pounds. The predetermined weight W1 may have a magnitude that depends on the size and style of the vehicle 10. For example, the predetermined weight W1 may be larger when the vehicle 10 is a pickup truck than when the vehicle 10 is a compact car.

Accordingly, in block 106, the controller 32 determines whether a first load 16A at a first location on the wheel well liner 28 has a weight greater than the predetermined weight W1 and also determines whether a second load 16B at a second location on the wheel well liner 28 has a weight greater than the predetermined weight W2. For example, the predetermined weight may be a combined weight of all loads indicated by all weight sensors on the wheel well liner 28. The controller 32 may be programmed to determine whether the combined weight of the loads 16A, 16B is greater than a predetermined weight. If the controller 32 determines that the weight of either load 16A, 16B, as indicated by the weight signals 38A, 38B, is greater than the predetermined weight W1, then the method proceeds to block 118. However, if the controller 32 determines that neither the weight of load 26A or the weight of load 26B is greater than the predetermined weight W1, then the method 100 proceeds to block 108, restarts the timer and the waiting period of blocks 112 and 116, and then repeats block 104 (determining whether the ambient temperature is less than the predetermined temperature T1), and block 106 (determining whether the weight of the load on the wheel well liner 22 is greater than the predetermined weight W1 (assuming that the query of block 108 is in the affirmative).

In block 118, the controller 32 activates the heating element 28 via the control signal 40 sent to the energy source 34, causing the energy source 34 to provide the electrical current 46 to the heating element 28. The method 100 then proceeds to block 120 and the timer 114 (or a different timer) is started. After block 120, the method proceeds to block 122 to determine whether the time elapsed since the timer 114 was started in block 120 is greater than a predetermined period of time TM2. For example, the predetermined period of time TM2 may be five minutes. If it is determined in block 122 that the time elapsed since the timer 114 was started in block 120 is not greater than the predetermined period of time TM2, then the method 100 repeats the query in block 122 periodically (at set periods) until it is determined that the predetermined period of time TM2 has elapsed. The method 100 then proceeds to block 124 in which the controller 32 commands that the heating element 28 is deactivated. The controller 32 provides a control signal 40 to the energy source 34 that terminates the electrical current 46 flowing from the energy source 34 to the heating element 28, such as by causing a switch within the energy source 34 to open.

After the heating element 28 is deactivated in block 124, the method 100 returns to block 108. The method 100 proceeds from block 108 continuously repeating during operation of the vehicle 10 until it is determined in block 108 that the vehicle 10 is no longer keyed on or started, in which case the method 100 proceeds to block 110 and ends.

Figure 3:
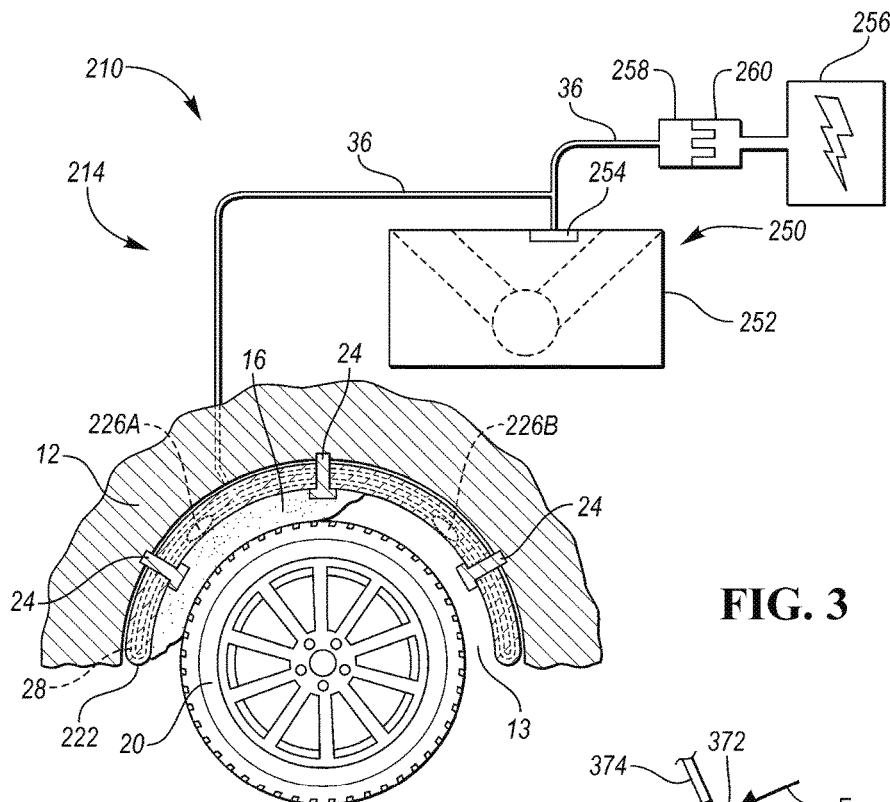
FIG. 3 is a schematic illustration in fragmentary partial cross-sectional view of a vehicle including a second embodiment of a wheel housing system in accordance with an alternative aspect of the present teachings.
Figure 4:
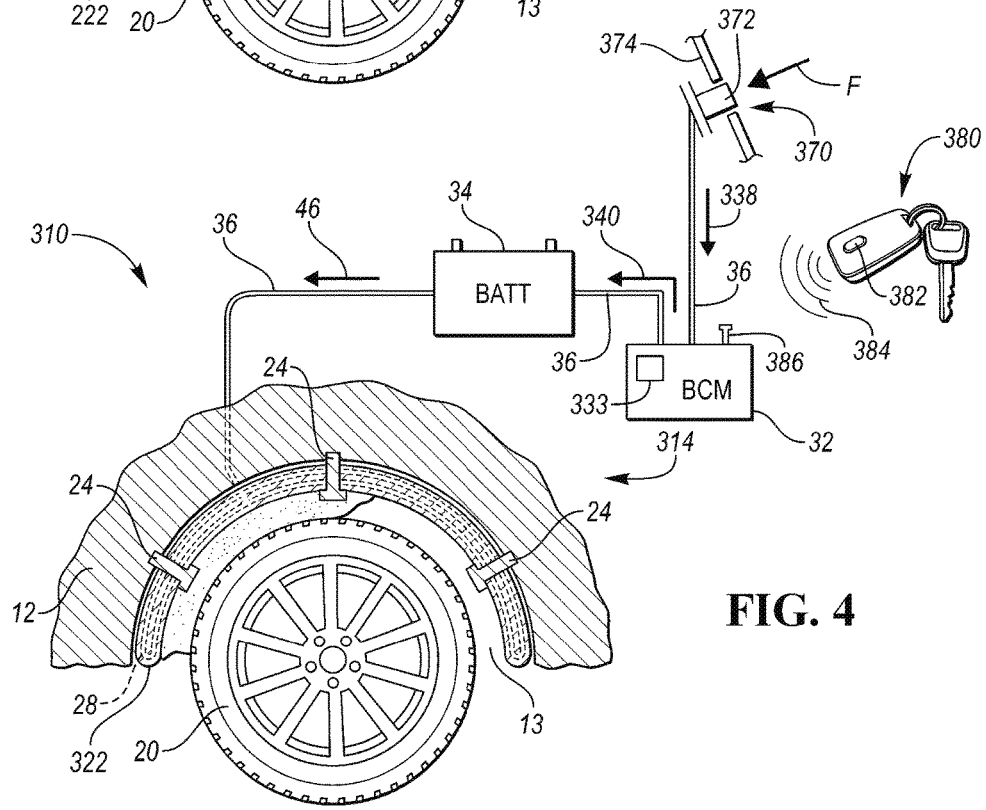
FIG. 4 is a schematic illustration in fragmentary partial cross-sectional view of a vehicle including a third embodiment of a wheel housing system in accordance with an alternative aspect of the present teachings.

FIGS. 3 and 4 show vehicles with wheel housing systems that include wheel well liners activated by other mechanisms that can be used in alternative to or in addition to the system 14 that implements the method 100. FIG. 3 shows a vehicle 210 with a wheel housing system 214. Components that are identical to those described with respect to FIG. 1 are indicated with like reference numbers. The system 214 includes a wheel well liner 222 secured to the wheel housing 12 and disposed in the wheel well 13. Weight sensors 226A, 226B are embedded in the wheel well liner 222 and are operable to indicate a weight of a load on the wheel well liner 222, such as load 16. Load 16 is lodged in the wheel well 13 on the wheel well liner 222 in a location closest to weight sensor 226A such that weight sensor 226A would indicate the weight of load 16. The weight sensors 226A, 226B are provided only if a controller 32 like that of FIG. 1 is operatively connected to the weight sensors 226A, 226B and implements the method 100. Optionally, the system 214 may have no weight sensors 226A, 226B, in which case the heating element 28 is activated only by selective connection to an energy source 256 as described herein. The heating element 28 is embedded in the wheel well liner 222 as described with respect to wheel well liner 22, and is operable to heat the wheel well liner 222.

The vehicle 210 includes an engine 250 that has an engine block 252. A block heater 254 is disposed on or in the engine block 252. The block heater 254 may be a resistive heating element. The block heater 254 is activated when a user manually selectively operatively connects an energy source 256 to the heating element 28 and thereby to the engine block 252. The connection is accomplished by plugging an electrical connector 258 into a mating connector 260 (such as an electrical outlet) connected to the energy source 256, such as electrical power. When the electrical connectors 258, 260 are mated, the energy source 256 heats the engine block 252.

The system 214 includes transfer conductors 36 that connect not only to the block heater 254 but also to the heating element 28. Accordingly, when a user chooses to activate the block heater 254, the heating element 28 is also activated so that the energy source 256 also heats the wheel well liner 222 via the heating element 28.

FIG. 4 shows a vehicle 310 with a wheel housing system 314. Components that are identical to those described with respect to FIG. 1 are indicated with like reference numbers. The system 314 includes a wheel well liner 322 secured to the wheel housing 12 and disposed in the wheel well 13. The controller 32 is selectively operatively connected to the energy source 34. A first manual actuation mechanism 370 is selectively operatively connected to the controller 32. The first manual actuation mechanism 370 is a push button 372 mounted on a dashboard 374. When manually actuated by depression, the push button 372 closes an electrical circuit to provide an actuation signal 338 over a transfer conductor 36 to the controller 32. The controller 32 has a processor 333 that provides a control signal 340 that commands the energy source 34 to energize the heating element 28 based on the actuation signal 338. Optionally, the processor 333 may also carry out the method 100 to activate the heating element 28 by an electric current 46 based on weights sensors (not shown in FIG. 4 but identical to sensors 26A, 26B) and a temperature sensor 42 (not shown in FIG. 4 but identical to sensor 42).

The wheel housing system 314 may include a second manual activation mechanism 380 in addition to or as an alternative to the first manual activation mechanism 370. The second manual activation mechanism 380 is a key FOB used to unlock the vehicle 310. The key FOB has a push button 382 that is manually depressible and provides an actuation signal when depressed. The activation signal 384 is picked up by a receiver 386 of the controller 32. When the receiver 386 receives the actuation signal 384, the controller 32 provides the control signal 340 to the energy source 34 as described with respect to the first actuation mechanism 370. Optionally, only one of the first manual actuation mechanism 370 or the second manual actuation mechanism 380 may be provided.

The various embodiments described herein enable activation of a heated wheel well liner 22, 222, or 322 to provide sufficient thermal energy to melt snow and ice built up in the wheel well 13.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A system for a vehicle with a wheel housing and a tire and wheel assembly, the system comprising:
    a wheel well liner secured to the wheel housing and disposed in a wheel well defined by the wheel housing;
    a heating element in contact with the wheel well liner and operable to heat the wheel well liner;
    a weight sensor operatively connected to the wheel well liner and operable to indicate a weight of a load on the wheel well liner, the load disposed on a side of the wheel well liner facing the tire and wheel assembly; and
    wherein the weight sensor is disposed between the wheel housing and the wheel well liner on a side of the wheel well liner facing away from the tire and wheel assembly.

2. The system of claim 1, further comprising:
    a controller operatively connected to the weight sensor and the heating element;
    an energy source operatively connected to the controller and to the heating element; and
    wherein the controller commands the energy source to energize the heating element based at least partially on the weight indicated by the weight sensor.

3. The system of claim 2, further comprising:
    a temperature sensor operatively connected to the controller; and
    wherein the controller commands the energy source to energize the heating element based at least partially on an ambient temperature reading indicated by the temperature sensor.

4. The system of claim 1, wherein the weight sensor is one of a load cell or a strain gauge transducer.

5. The system of claim 1, wherein the heating element is embedded in the wheel well liner.

6. The system of claim 5, wherein the heating element is a resistive wire arranged in a grid pattern.

7. The system of claim 1, wherein the vehicle includes an engine block, and the system further comprising:
    an energy source; and
    an electrical connector selectively operatively connecting the energy source with the engine block and the heating element such that the energy source heats the engine block, and the energy source heats the wheel well liner via the heating element.

8. The system of claim 1, further comprising:
    a controller;
    an energy source operatively connected to the controller; and
    a manual actuation mechanism operatively connected to the controller and manually actuatable to provide an actuation signal to the controller;
    wherein the controller commands the energy source to energize the heating element based at least partially on the actuation signal.

9. The system of claim 1, wherein the weight sensor is a first weight sensor, and the system further comprising:
    a second weight sensor disposed between the wheel well liner and the wheel housing and rearward of the first weight sensor.

10. The system of claim 1, wherein the wheel well liner comprises a fabric mesh.

11. A vehicle comprising:
    a wheel housing defining a wheel well;
    a tire and wheel assembly disposed in the wheel well;
    a wheel well liner secured to the wheel housing and disposed in the wheel well between the wheel housing and the tire and wheel assembly;
    a weight sensor operatively connected to the wheel well liner and operable to indicate a weight of a load on the wheel well liner, the load disposed on a side of the wheel well liner facing the tire and wheel assembly;
    wherein the weight sensor is disposed between the wheel housing and the wheel well liner on a side of the wheel well liner facing away from the tire and wheel assembly; and
    a heating element in contact with the wheel well liner and operable to heat the wheel well liner.

12. The vehicle of claim 11, further comprising:
    a temperature sensor operable to indicate an ambient temperature outside of the vehicle;
    a controller operatively connected to the weight sensor, the temperature sensor, and the heating element;
    an energy source operatively connected to the controller and to the heating element; and
    wherein the controller is configured to execute a stored set of instructions by which the controller:
        determines whether the ambient temperature indicated by the temperature sensor is less than a predetermined temperature;
        determines whether the weight of the load on the wheel well liner indicated by the weight sensor is greater than a predetermined weight; and
        activates the heating element if the ambient temperature is less than the predetermined temperature and the weight of the load on the wheel well liner is greater than the predetermined weight.

13. The vehicle of claim 11, further comprising:
    a controller;
    an energy source operatively connected to the controller;
    a manual actuation mechanism operatively connected to the controller and manually actuatable to provide an actuation signal to the controller; and
    wherein the controller commands the energy source to energize the heating element based at least partially on the actuation signal.

14. The vehicle of claim 13, further comprising:
    a dashboard; wherein the manual actuation mechanism is a push button on the dashboard or on a vehicle key fob.

15. The vehicle of claim 11, further comprising:
    an engine block;
    an energy source operatively connected to the heating element and to the engine block; and
    an electrical connector selectively connecting the energy source with the engine block and the heating element such that the energy source heats the engine block, and the energy source heats the wheel well liner via the heating element.

16. The vehicle of claim 11, wherein the weight sensor is a first weight sensor, and the system further comprising:
    a second weight sensor disposed between the wheel well liner and the wheel housing and rearward of the first weight sensor.

17. The vehicle of claim 11, wherein the wheel well liner comprises a fabric mesh.

* * * * *